(12) United States Patent
Campbell et al.

(10) Patent No.: US 6,292,493 B1
(45) Date of Patent: *Sep. 18, 2001

(54) METHOD AND APPARATUS FOR DETECTING COLLISIONS ON AND CONTROLLING ACCESS TO A TRANSMISSION CHANNEL

(75) Inventors: Graham M. Campbell, Batavia; Wenxin Xu, Westmont, both of IL (US)

(73) Assignee: Illinois Institute of Technology, Chicago, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/833,836

(22) Filed: Apr. 10, 1997

Related U.S. Application Data

(60) Continuation of application No. 08/364,156, filed on Nov. 29, 1994, now abandoned, which is a division of application No. 08/073,206, filed on Jun. 4, 1993, now Pat. No. 5,390,181.

(51) Int. Cl.[7] .................................................. H04L 12/403
(52) U.S. Cl. ........................ 370/445; 370/447; 370/461
(58) Field of Search .................................. 370/85.1, 85.2, 370/85.3, 85.6, 85.7, 95.1, 110.1, 412, 440, 442, 444, 445, 447, 458, 461, 462

(56) References Cited

U.S. PATENT DOCUMENTS

| | | | |
|---|---|---|---|
| 4,774,707 | * | 9/1988 | Raychaudhuri ..................... 370/85.2 |
| 5,303,234 | * | 4/1994 | Kou ..................................... 370/85.2 |
| 5,390,181 | * | 2/1995 | Campbell et al. .................. 370/85.2 |

OTHER PUBLICATIONS

Xu, Wenxin, "Distributed Queueing Random Access Protocols for a Broadcast Channel", thesis paper, Illinois Institute of Technology, Chicago Illinois, Dec. 1990.*

* cited by examiner

*Primary Examiner*—William Luther
(74) *Attorney, Agent, or Firm*—Pauley Peterson Kinne & Fejer

(57) ABSTRACT

A method for controlling multiple access of a transmission channel wherein a plurality of different patterns are assigned to a plurality of sending stations so that each sending station corresponds to a unique pattern, preferably a pattern represented by a Binomial coefficient. Each unique pattern is transmitted from a corresponding sending station to the transmission channel by way of a control minislot. Ternary feedback is received from the control minislot. A summation of different patterns within each control minislot are analyzed to detect whether a collision exists between the different patterns within each control minislot.

7 Claims, 12 Drawing Sheets

$W_o <= T_{i-1} - X_{i-1}$ $W_o > T_{i-1} - X_{i-1}$

| MULTIPLICITY n | CRI LENGTH ||||| 
| | NUMBER OF MINISLOTS |||||
| | 2 | 3 | 4 | 8 | 16 |
| --- | --- | --- | --- | --- | --- |
| 0 | 1.000 | 1.000 | 1.000 | 1.000 | 1.000 |
| 1 | 1.000 | 1.000 | 1.000 | 1.000 | 1.000 |
| 2 | 2.000 | 1.500 | 1.333 | 1.142 | 1.066 |
| 3 | 3.333 | 2.250 | 1.866 | 1.396 | 1.192 |
| 4 | 4.761 | 3.115 | 2.514 | 1.736 | 1.369 |
| 5 | 6.209 | 4.026 | 3.222 | 2.139 | 1.591 |
| 6 | 7.656 | 4.951 | 3.958 | 2.590 | 1.853 |
| 7 | 9.100 | 5.874 | 4.703 | 3.074 | 2.149 |
| 8 | 10.542 | 6.792 | 5.447 | 3.582 | 2.475 |
| 9 | 11.984 | 7.704 | 6.185 | 4.104 | 2.826 |
| 10 | 13.426 | 8.612 | 6.915 | 4.635 | 3.198 |

FIG.5

| MAXIMUM INPUT RATE AND THE CORRESPONDING WINDOW SIZE AS A FUNCTION OF THE MINISLOT NUMBER ||||||
|---|---|---|---|---|---|
| m | MAX INPUT RATE | WINDOW SIZE | m | MAX INPUT RATE | WINDOW SIZE |
| 2 | 0.859 | 2.642 | 10 | 2.4891 | 2.520 |
| 3 | 1.2400 | 2.794 | 11 | 2.6063 | 2.483 |
| 4 | 1.5156 | 2.835 | 12 | 2.7171 | 2.442 |
| 5 | 1.7353 | 2.799 | 13 | 2.8226 | 2.425 |
| 6 | 1.9207 | 2.726 | 14 | 2.9234 | 2.409 |
| 7 | 2.0834 | 2.670 | 15 | 3.0201 | 2.376 |
| 8 | 2.2299 | 2.611 | 16 | 3.1133 | 2.363 |
| 9 | 2.3642 | 2.552 | | | |

FIG.6

| COMPARISONS OF THE AVERAGE DELAY AND DEVIATION BETWEEN DQRAP AND THE M/D/1 SYSTEM (THE NUMBER OF MINISLOTS = 3) | | | | |
|---|---|---|---|---|
| NOMINAL INPUT RATE | SIMULATED INPUT RATE | PROTOCOLS | | |
| | | M/D/1 ANALYZED | M/D/1 SIMULATED | DQRAP SIMULATED |
| | | AVG | AVG/STD | AVG/STD |
| 0.10 | 0.1004 | 1.5556 | 1.5549<br>0.3518 | 1.7152<br>0.7617 |
| 0.20 | 0.2005 | 1.6250 | 1.6239<br>0.4273 | 1.9661<br>1.0459 |
| 0.30 | 0.3004 | 1.7143 | 1.7137<br>0.5229 | 2.2533<br>1.2672 |
| 0.40 | 0.4006 | 1.8333 | 1.8365<br>0.6518 | 2.5867<br>1.4663 |
| 0.50 | 0.5003 | 2.0000 | 2.0022<br>0.8184 | 2.9838<br>1.6732 |
| 0.60 | 0.6003 | 2.2500 | 2.2543<br>1.0805 | 3.4895<br>1.9453 |
| 0.70 | 0.7004 | 2.6667 | 2.6746<br>1.5057 | 4.1923<br>2.3431 |
| 0.80 | 0.8000 | 3.5000 | 3.5113<br>2.3585 | 5.3407<br>3.0836 |
| 0.90 | 0.8995 | 6.0000 | 5.9918<br>4.7571 | 8.2555<br>5.3156 |
| 0.95 | 0.9499 | 11.0000 | 10.7504<br>9.4069 | 13.5251<br>9.9712 |

FIG.10

| COMPARISONS OF AVERAGE DELAY AND DEVIATION OF DQRAP WITH VARYING MINISLOT NUMBER |||||| 
|---|---|---|---|---|---|
| NOMINAL INPUT RATE | SIMULATED INPUT RATE | DQRAP ||||
| | | m=3 | m=4 | m=8 | m=16 |
| | | AVG/STD | AVG/STD | AVG/STD | AVG/STD |
| 0.10 | 0.1004 | 1.7152<br>0.7617 | 1.6982<br>0.7035 | 1.6761<br>0.6298 | 1.6666<br>0.5990 |
| 0.20 | 0.2005 | 1.9661<br>1.0459 | 1.9218<br>0.9433 | 1.8747<br>0.9938 | 1.8567<br>0.7957 |
| 0.30 | 0.3004 | 2.2533<br>1.2672 | 2.1786<br>1.1326 | 2.0989<br>0.9938 | 2.0715<br>0.9490 |
| 0.40 | 0.4006 | 2.5867<br>1.4663 | 2.4699<br>1.3012 | 2.3604<br>1.1457 | 2.3186<br>1.0926 |
| 0.50 | 0.5003 | 2.9838<br>1.6732 | 2.8097<br>1.4639 | 2.6564<br>1.2899 | 2.6052<br>1.2364 |
| 0.60 | 0.6003 | 3.4895<br>1.9453 | 3.2445<br>1.6836 | 3.0400<br>1.4961 | 2.9795<br>1.4434 |
| 0.70 | 0.7004 | 4.1923<br>2.3431 | 3.8413<br>2.0288 | 3.5808<br>1.8361 | 3.5015<br>1.7911 |
| 0.80 | 0.8000 | 5.3407<br>3.0835 | 4.8690<br>2.7636 | 4.5353<br>2.5939 | 4.4367<br>2.5491 |
| 0.90 | 0.8995 | 8.2555<br>5.3156 | 7.5451<br>5.0126 | 7.1088<br>4.8637 | 7.0018<br>4.8503 |
| 0.95 | 0.9499 | 13.5251<br>9.9712 | 12.5975<br>9.6747 | 12.1022<br>9.5977 | 11.9715<br>9.5731 |

FIG.11

METHOD AND APPARATUS FOR DETECTING COLLISIONS ON AND CONTROLLING ACCESS TO A TRANSMISSION CHANNEL

This application is a continuation of U.S. patent application Ser. No. 08/364,156, filed Nov. 29, 1994, now abandoned, which is a division of U.S. patent application Ser. No. 08/073,206 filed Jun. 4, 1993, now U.S. Pat. No. 5,390,181.

BACKGROUND OF THE INVENTION

1. Field of the Invention

This invention relates to a method for detecting collisions in a transmission channel using a distributed queueing random access protocol (DQRAP) wherein broadcast channel time is divided into a plurality of slots, each of which includes one data slot and one or more control minislots, and each of a plurality of sending stations maintains two common distributed queues. One queue, the data transmission queue, is used to organize the order of data transmission, and the other queue, the collision resolution queue, is used to resolve collisions that have occurred and to prevent collisions by new arrivals. The protocol includes data transmission rules, request transmission rules and queueing discipline rules.

2. Description of Prior Art

Investigation of multiple, random access control methods has been an active research area since as early as 1970. The well known CSMA protocols were then developed and later followed by multiple access methods which utilized various forms of feedback to improve performance by reducing or avoiding the occurrence of collisions. These included collision resolution schemes, now called tree-and-window collision resolution algorithms (CRA). The CSMA protocols achieved high throughput with minimal delay with low offered loads, and they have gained wide application in local area networks. In fact with zero propagation delay, collisions in slotted CSMA can be completely avoided and the performance of CSMA then corresponds to that of a perfect scheduling protocol, such as an M/D/1 queue. However, the CSMA protocols are not stable when traffic is heavy and while dynamic control mechanisms can improve performance, the unstable nature cannot be changed.

The first CRA included a tree algorithm which achieved a maximum throughput of 0.43, and was stable for all input rates of less than 0.43. This stable characteristic of the tree algorithm has attracted much attention in both the communications and information theory areas. The tree algorithm was improved by increasing the maximum throughput to 0.462. The next improvement was the 0.487 window protocol. The tree and window protocols are based on efficient use of channel feedback to resolve collisions and require transmitter coordination. It has been shown that the upper bound of throughput of all algorithms based on ternary feedback is 0.568, the tightest upper bound to date.

It is widely believed that the best achievable throughput is in the neighborhood of 0.5. If the amount of channel feedback is increased to indicate the number of packets involved in each collision, then throughput up to one may be achieved. However, the known algorithms in this context achieve only 0.533 throughput. Some known protocols achieve higher throughput than 0.5 by using control minislots (CMS) to obtain extra feedback. Among such known protocols, the announced arrival random access protocols (AARA) achieve the best performance with respect to throughput and delay characteristics. With three minislots the AARA protocol achieves a throughput of 0.853. However, to achieve throughput approaching one, the AARA protocol must use an infinite number of minislots. Obviously, the AARA protocols do not achieve or approach the bound of performance in this context. All existing tree protocols seem to use data slots to resolve collisions. In this process, channel capacity is lost either to empty slots or to collisions. All suggested improvements to tree protocols increased the channel throughput by reducing empty slots and collided slots, but none eliminated this type of loss.

SUMMARY OF THE INVENTION

It is one object of this invention to provide a method for controlling multiple access of a transmission channel through the detection of collisions by comparing a plurality of different patterns within a control minislot.

It is another object of this invention to assign different Binomial coefficients to a plurality of sending stations and to use such Binomial coefficients to detect collisions.

It is still another object of this invention to use a distributed queueing random access protocol in various systems, such as with packet radio, satellite, broadband cable, cellular voice, and other passive optical networks.

The distributed queueing random access protocol (DQRAP) of this invention is a stable random multiple access protocol for use in a broadcast channel shared by an infinite number of bursty stations. The DQRAP according to this invention is based on tree protocols with minislots. These tree protocols use minislots to provide extra feedback in order to reduce the number of empty and collided slots. However, the DQRAP according to this invention uses the minislots for collision resolution and resolves the data slots for data transmission. Implicitly, even though counters are often used, conventional tree algorithms use a single queue which performs as a collision resolution queue. The method according to this invention achieves the desired performance by introducing an additional queue, the data transmission queue, to schedule data transmission parallel to contention resolution and thereby nearly eliminating contention in the data slots. The DQRAP of this invention, using as few as three minislots, achieves a performance level which approaches that of a hypothetical perfect scheduling protocol, such as the M/D/1 system, with respect to throughput and delay.

BRIEF DESCRIPTION OF THE DRAWINGS

The above-mentioned and other features and objects of this invention will be better understood from the following detailed description taken in conjunction with the drawings wherein:

FIG. 4b shows a diagrammatic view of the control minislots and the data slot being fed back to each sending station, in response to the information transmitted, as shown in FIG. 4a;

FIG. 5 is a table showing values of CRI lengths ($L_n$) as a function of different values of n;

FIG. 6 is a table showing maximum input rates and the corresponding window sizes as a function of the minislot number;

FIG. 10 is a table showing the average delay and deviation between the DQRAP according to this invention and an M/D/1 system, wherein the number of minislots is equal to three;

FIG. 11 is a table showing a simulated average delay and the corresponding deviation of the DQRAP of this invention, with a varying number of minislots.

DESCRIPTION OF PREFERRED EMBODIMENTS

Conventional multiple access protocols have proposed the use of control minislots (CMS), in addition to a dataslot (DS), to provide binary or ternary feedback in order to improve performance. Most conventional multiple access protocols have never been implemented, possibly because the improvement in performance has not been sufficient to offset the overhead of the CMS. However, Distributed Queueing Random Access Protocol (DQRAP) according to this invention provides a performance which approaches that of a hypothetical perfect scheduling protocol, such as the M/D/1 system, with respect to throughput and delay. The DQRAP of this invention achieves this performance using as few as three CMS providing ternary feedback. The method of this invention can be achieved with several preferred embodiments for acquiring ternary feedback in a variety of media.

Figure 1:
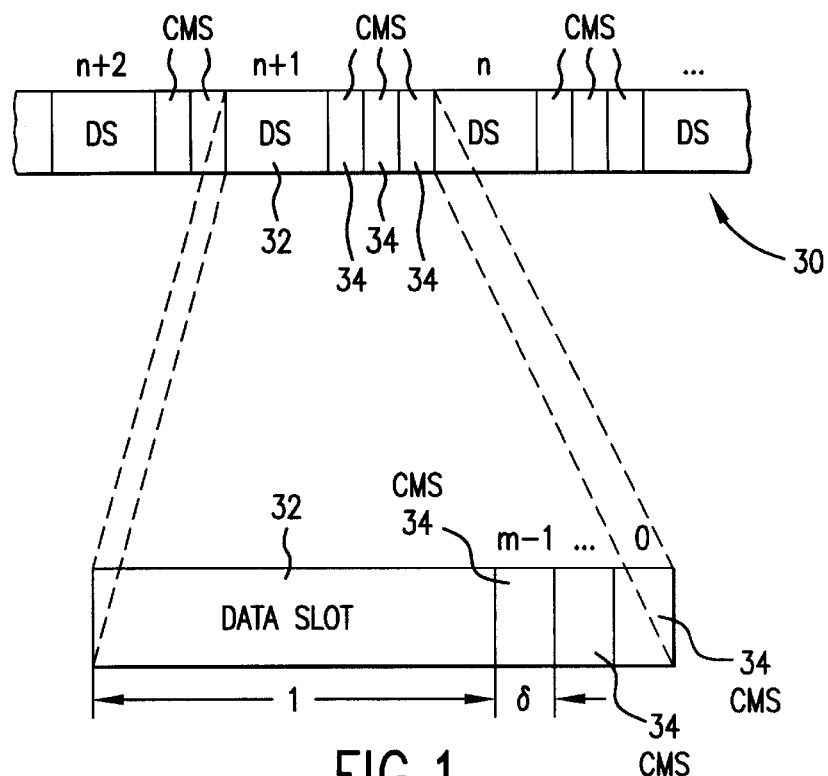
FIG. 1 is a diagrammatic representation of a slot format according to one preferred embodiment of this invention, which includes a data slot and a variable number of control minislots.

According to this invention, ternary feedback is defined as the ability of a receiver to differentiate between three conditions: (1) no signal present or an absence of a pattern: (2) a single signal present or a presence of only one pattern; and (3) multiple signals present or a presence of two or more patterns. These events occur when sending stations 24 operate under a protocol which permits sending stations 24 to transmit either arbitrarily or under rules which may allow two or more sending stations 24 to simultaneously transmit on the same transmission channel 30. FIG. 1 shows one preferred layout of DS 32 and CMS 34. The length of one CMS 34 is preferably minimized according to this invention, because if each CMS 34 requires one-third, for example, of the overall slot in a system using three CMS 34, then the entire bandwidth would be consumed by the CMS 34. According to one preferred embodiment of this invention, each CMS 34 uses a minimum of bandwidth and a receiver is able to discriminate between no transmission, one transmission, and more than one transmission in one CMS 34. Ideally, each CMS 34 should utilize something less than 1% of the slot so that overhead for a three-minislot system is well under 10%. If the viability of acquiring ternary feedback can be demonstrated, then the only obstacles to implementing the DQRAP according to this invention are those common to other conventional communications protocol.

According to one preferred embodiment of this invention, an energy level threshold ternary feedback (ELTTFB) is implemented by having each sending station 24 transmit a signal for the duration of one CMS at a power level such that the signals from sending stations 24, after normal transmission loss, each arrive at the receiver with the same power. The additive nature of the energy in the arriving signals indicates that a received signal level above a given threshold can be treated as a collision. This is feasible in a fiber optic environment when information is transmitted by turning the light source on and off. In a fiber optic system, it appears feasible to assign a CMS duration of about three or four bit times. This implies an overhead of about 12 bits added to a sample asynchronous transfer mode (ATM) cell, having 424 bits, for overhead of 2.75%, which is well under a 10% objective for this invention.

According to another preferred embodiment of this invention, combinatoric ternary feedback (CTFB) can be used, particularly in an environment where it may be difficult to implement the previously described ELTTFB method. CTFB is preferably implemented by assigning each station a value C(n,k) which represents one of a plurality of patterns when k items at a time are selected from n objects, which corresponds to the Binomial Theorem. For instance, if there are 10 stations then a coefficient of C(5,2) provides 10 different patterns, each with two '1s'. According to such coefficient C(5,2), patterns could be assigned to each sending station 24 wherein:

Station 1 transmits 11000;
Station 2 transmits 10100;
Station 3 transmits 10010;
Station 4 transmits 10001;
Station 5 transmits 01100;
Station 6 transmits 01010;
Station 7 transmits 01001;
Station 8 transmits 00110;
Station 9 transmits 00101; and
Station 10 transmits 00011.

If the receiver detects more than two '1s' arriving in one CMS 34 period, then a collision within transmission channel 30 has occurred. Such detection method is simplified according to this invention since the receiver is looking only for the presence of a signal rather than attempting to assess whether a received signal is over or under a given threshold. The number of '1s' can be determined by counting pulses or by integrating over a time period of one CMS 34 and comparing with a threshold.

When using the CTFB method, the overhead is greater than when using the ELTTFB method but the CTFB method of this invention is still practical for many applications. For instance, in an ATMLAN with 64 stations, a coefficient of C(8,4) provides 70 different available patterns. Overhead for three CMS in an ATM Cell 24/424 is 5.67%, again well under an arbitrary overhead limit of 10%. Collisions are easier to detect with the CTFB method than with the ELTTFB method. One advantage of the CTFB method is that sending station 24 can be identified since each sending station 24 is transmitting a unique pattern.

In another preferred embodiment according to this invention, a digital logic ternary feedback (DLTFB) method is used to detect collisions. In true bus systems, signals arriving from two or more sources are physically or'ed and the signal levels are essentially summed. This aspect is assumed in the previously described ELTFB and CTFB methods. In digital systems such as 56 kbps DDS, T1, etc., separate signals are not physically combined since this would produce undefined results. Instead, logic either is used to produce a new signal depending upon the inputs or is used to gate one of the input signals to the output. The DLTFB method according to this invention is easily implemented in these systems.

The operation of the DLTFB method can be defined in practical terms using telephone terminology. Assume that a WAN network of 56 kbps leased lines is designed as a multi-drop network. In each city on the network there is a junction point at the point of presence (POP) of the interexchange carrier. The sending station in each city is connected to the interexchange circuit (IXC) at the POP via a local channel provided by the local carrier. When a sending station opts to write in a particular CMS a 00 or a 01 is transmitted, 00 representing no transmission and 01 representing a transmission. The timing, provided by the outbound circuit, is such that the two bits arrive at the POP junction at exactly the same time as the CMS arriving on the inbound IXC from another city. The logic at the junction compares the two inputs and transmits according to the following table:

| IN(1)<br>(IXC) | IN(2)<br>(LOCAL) | OUT |
| --- | --- | --- |
| 00"E" | 00"E" | 00"E" |
| 00"E" | 01"S" | 01"S" |
| 01"S" | 00"E" | 01"E" |
| 01"S" | 01"S" | 11"C" |
| 11"C" | 00"E" | 11"C" |
| 11"C" | 01"S" | 11"C" |

The letters "E", "S", and "C" represent empty, successful and collision, respectively, the terms usually used in the protocols which employ ternary feedback. There are three possible inputs from the inbound IXC since there may have been a collision at a previous city on the "tree".

Three CMS require 6 bits and thus the overhead on the previously described ATM cell is 1.42%. The efficiency of the DLTFB method according to this invention permits the CMS size to be increased so as to include requests for a specific number of frames, and to include priority levels.

Where synchronization is available, the DLTFB method according to this invention is preferred. However, if synchronization on an approximately 56 Kbps or higher digital circuit cannot be guaranteed such that a sequence of two bits representing the transmission in one CMS 34 by one sending station 24 does not arrive at a common point at the same time as the two bits representing the transmission of another sending station 24, then the CTFB method according to this invention should preferably be used. The number of sending stations 24 will normally determine the size of the coefficient C(n, k) to which a number of guard bits are added to compensate for the lack of synchronization. When two CMS 34 mapped in such fashion arrive at common point, the fact that one of the slots may be one or more bits out of synchronization with the other will not matter since the resulting transmission will represent an illegal pattern or a pattern which indicates a collision. Receiver 26 then need only search in a range including the guard band for an acceptable pattern containing all zeros, or some other suitable pattern which would indicate a collision.

According to still another preferred embodiment of this invention, the carrier combinatoric ternary feedback (CCTFB) method is used to detect collisions. The CCTFB method is applicable to broadband systems which use a modulated carrier to convey digital data. Such broadband systems include CATV systems, packet radio systems, cellular radio systems, satellite systems, and fiber optic systems where a modulated carrier is used. The normal lock-on and synchronization to data of such systems introduce very high overhead values if normal data transmission is used in CMS. For instance, in a typical 9600 bps packet radio system utilizing a 450 MHz carrier the typical data lock-on and synchronization period is 10 ms–20 ms. Three such periods could sum to as much as 60 milliseconds, longer than the previously discussed ATM cell which at 9600 bps is 44 milliseconds. Aside from the overhead there is a problem with the "capture" effect prevalent in many conventional systems which utilize modulated carriers. In such a system a receiver locks onto a single received carrier, disregarding other carriers. This is a desirable trait in normal circumstances and is designed into most radio systems. But if the object is to detect the presence of two or more signals, the capture effect is disastrous.

The CCTFB method according to this invention uses the capture effect to identify the presence of two or more signals. Each station is assigned a coefficient C(n,k) pattern as previously described. Each CMS is then allocated a duration sufficient to contain n individual signals of length t. Each of the n signals are a burst of carrier of length t. If the C(n,k) pattern has adjacent '1s', then the carrier just remains turned on for each of the adjacent '1s'. Simply put, sending station 24 transmits in one CMS 34 by turning the carrier on or off according to the C(n,k) pattern. Each carrier on a period corresponding to a "1" in the pattern is of length t seconds. The receiver uses conventional filtering and phase locked loop (PLL), or another suitable detection technique, to detect the carrier. For a C(n,k) system, a CMS has a basic time period of nt seconds. A transmitting station turns on its carrier for k periods of t seconds during one CMS 34 interval. Receiver 26 locks onto the arriving carrier and either by counting cycles or integrating over the CMS period makes an estimate of empty represented by no signal present in one CMS 34, successful represented by only one signal present in one CMS 34, or collision represented by two or more signals present in one CMS 34. The carrier will be present for no transmission, present for kt seconds for a single transmission, and present for more than kt seconds for a collision.

There are two major advantages to using the CCTFB method of this invention in those systems where it is feasible. First, the period t can be less than one or two hundred cycles of the carrier. This is more than adequate for the receiver to detect and lock on. Most carriers of interest operate at frequencies higher than 20 MHz. A period t of 200 cycles at 20 MHz takes 10 microseconds. Even in a C(n,k) system where n=16, the CMS 34 time period would be: 16–10 microseconds ($\mu$s)=0.16 milliseconds (ms), for a total of 0.48 ms. This means that slots can be as short as 10 ms and an overhead constraint of less than 5% would be satisfied. As the carrier frequency increases, the data carrying capacity is increased. However, frame sizes usually remain at the same size making the duration of the data slots shorter. One advantage of the CCTFB method of this invention is that as the carrier frequency increases, the time duration of the CMS, at 200 cycles, is reduced so that the overhead remains proportionally the same. In fact, at speeds envisioned in fiber optic networks the CMS overhead could become minuscule. Maximum on-off repetition rates can be set to ensure that bandwidth limits are not exceeded.

Second, the capture effect is used to an advantage. If two or more sending stations 24 transmit in the same period t(i) in one CMS 34, the capture of one signal contributes to the total count in the CMS period. The total count will then exceed the expected count of k. If there is interference and neither signal is received, then the decision about a collision must be determined from the remainder of the signal. However, with a C(8,4), the minimum practical value of n and k in one preferred embodiment of this invention, the probability that two or more colliding patterns in one CMS 34 will result in a count of 4 is relatively low, even if the capture effect fails.

The preferred methods of this invention are particularly suitable for use with a communication system accommodating or serving an infinite number of sending stations 24 or bursty stations which communicate over a multiaccess and noiseless broadcast channel. Sending stations 24 preferably generate single messages of fixed length. Transmission channel 30 is preferably divided into slots of fixed length. As shown in FIG. 1, each slot comprises a variable number m of CMS 34 followed by a single DS 32. The size of one DS 32 is assumed to be of length 1, equal to the length of messages generated by each sending station 24. Each CMS 34 is assumed to be of a length $\delta$. The size of $\delta$ is implementation dependent but $\delta$ is assumed to be much smaller than the corresponding DS 32, $\delta<<1$. $(1+m\delta)$ is defined as a channel time unit (CU). Assume, for example, that the generation times of the messages form a Poisson point process with intensity of $\lambda$ messages per unit time. $\lambda$ is also called input rate. One sending station 24 may transmit a message in DS 32 and/or a request in one CMS 34. All sending stations 24 can synchronize on both CMS 34 and DS 32 boundaries and all sending stations 24 can detect ternary feedback information for each CMS 34 and each DS 32 from transmission channel 30 immediately after transmission. The assumption of immediate feedback is unrealistic, however, the collision resolution algorithms can be modified to accommodate delayed feedback.

Figure 4A:
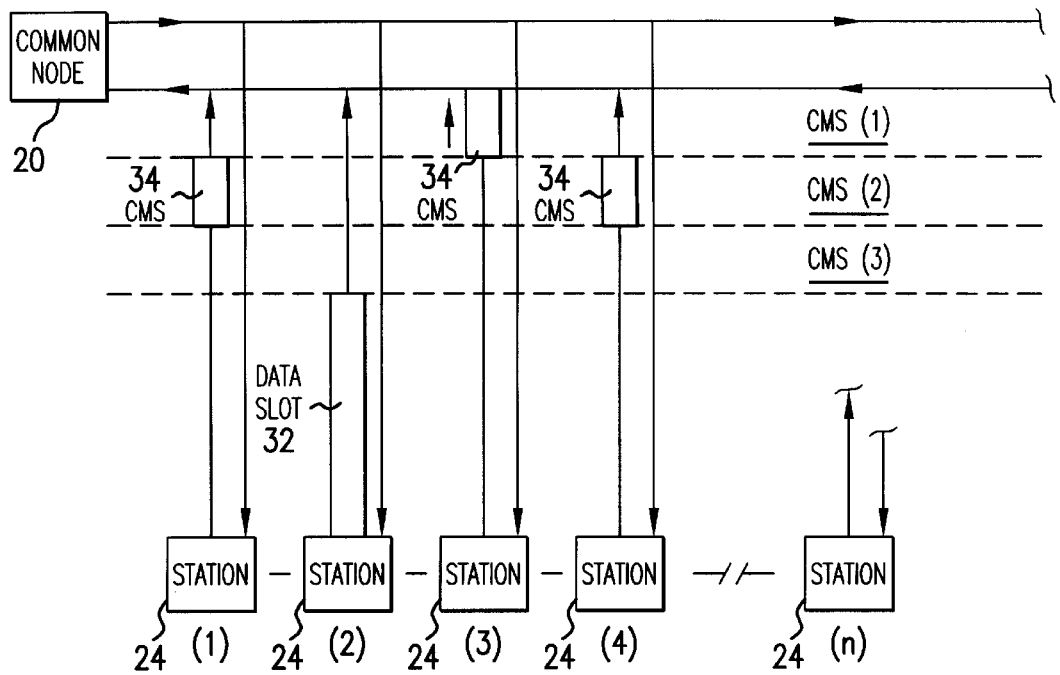
FIG. 4a shows a diagrammatic view of sending stations transmitting control minislots and a data slot during one slot time, according to one preferred embodiment of this invention.
Figure 4B:
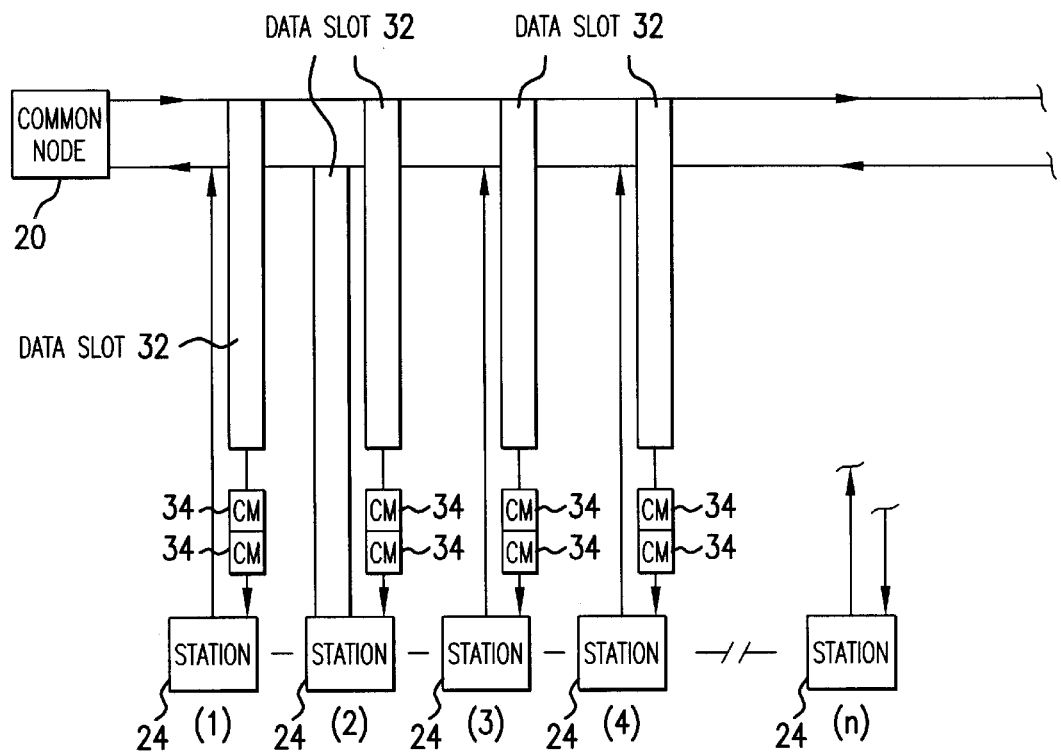

FIGS. 4a and 4b show a schematic representation of a topology wherein detecting the state of each CMS 34 can be accomplished at either common node 20 or at sending stations 24. It is apparent that a base node, a base station or the like, as well as any suitable passive or active element, can be used in lieu of common node 20. If common node 20 is used to determine the status of CMS 34, it then transmits a two bit pattern representing the ternary feedback results of each CMS 34 to sending stations 24. In such method according to one preferred embodiment of this invention, the technology required to ascertain the status of CMS 34 need only be built once. Such preferred method of this invention can also be used as a default method in systems where sending stations 24 always transmit to a central data base rather to other stations.

Figure 2A:
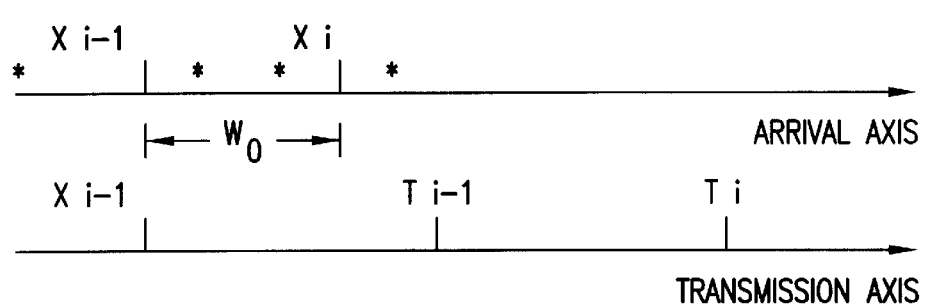
FIGS. 2a and 2b are diagrammatic representations of sequenced events for an enable transmission interval (ETI) and a contention resolution interval (CRI)
Figure 2B:
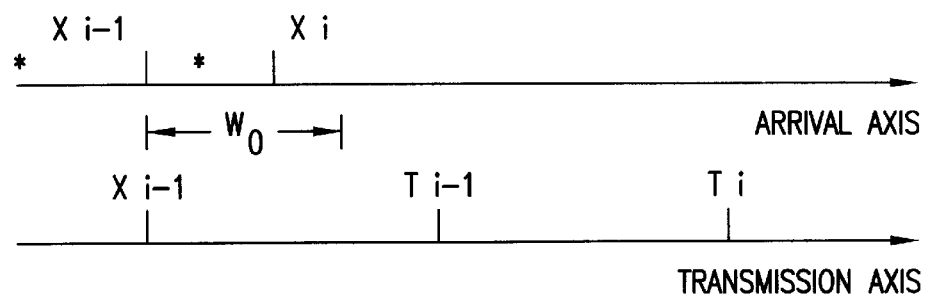

The basic principle of the tree collision resolution algorithm is to resolve one initial collision before trying to resolve another one. In order to decouple transmission time from arrival time, let $t_{i-1}$ represent the instant in the transmission axis that all messages have arrived before the instant of $X_{i-1}$ in the arrival axis and have successfully resolved their conflicts, as illustrated in FIGS. 2a and 2b. The interval $(x_{i-1}, t_{i-1})$ is called the waiting interval. The interval $(x_{i-1}, x_i)$ is called the enable transmission interval (ETI), which is determined from the following formula:

$$x_i = x_{i-1} + \min\{W_0, t_{i-1} - x_{i-1}\} \qquad \text{Eqn. 1}$$

where $W_o$ is called the default window size which is optimized by performance requirements. Obviously, if the length of a waiting interval is greater than the default window size, the ETI is part of the waiting interval, as shown in FIG. 2a, otherwise the ETI is equal to the waiting window, as shown in FIG. 2b.

In the DQRAP according to this invention, collision resolution is based on the ETI. Only after all messages in the current ETI have successfully resolved their conflicts can the next ETI be initiated. If an instant $t_i$ all messages in the ETI $(x_{i-1}, x_i)$ have successfully resolved their conflicts, the interval $(t_{i-1}, t_i)$ is called the contention resolution interval (CRI) corresponding to ETI $(x_{i-1}, x_i)$. In the DQRAP of this invention, two distributed queues are maintained by each sending station 24: the data transmission queue, or simply TQ, and the collision resolution queue, or simply RQ. |TQ(t)| and |RQ(t)| represent the queue lengths of TQ and RQ at the instant t, respectively. The phrase "transmit a request" means that a station rolls an m-sided die and transmits a request signal in the selected minislot.

Let $F_j$, where j=1,2, . . . m, denote feedback from the j-th CMS. $F_j$ belongs to the set of {E,S,C}, where E denotes an empty minislot, S denotes the presence of a single request signal in a minislot, and C denotes the presence of two or more request signals transmitted in a single minislot.

The protocol of this invention comprises three main sets of rules: data transmission rules (DTR), request transmission rules (RTR), and queueing discipline rules (QDR). A first come first scheduled (FCFS) scheduling discipline is used for both the TQ and the RQ but other scheduling disciplines could be utilized. Basically the DTR, the RTR and the QDR address the issues: (1) who can transmit data and when; (2) who can transmit requests and when; and (3) how does the channel feedback affect the queues.

The following Data Transmission Rules (DTR) apply to the method of this invention:
(1) If (|TQ(t)|=0&&|RQ(t)|=0) then sending stations 24 with messages which have arrived in the current ETI transmit messages in DS 32 at time (t); and
(2) If (|TQ(t)|>0) then sending station 24 which owns the first entry in the TQ transmits its message in DS 32 at time (t).

The following Request Transmission Rules (RTR) apply to the method of this invention:
(1) If (|RQ(t)|=0) then sending stations 24 with messages which have arrived in the current ETI transmit requests at time (t); and
(2) If |RQ(t)|>0 then sending stations 24 which "own" the first entry in the RQ transmit requests at time (t).

The following Queueing Discipline Rules (QDR) apply to the method of this invention:
At time (t), using data slot or minislot feedback:
(1) Each sending station 24 increments |TQ(t)| for each $(F_j(j=1, \ldots m)=S)$;
(2) Each sending station 24 decrements |TQ(t)| by one at (t) for a successful message transmission commencing at (t−1);

(3) If $|RQ(t)|=0$ each sending station 24 increments $|RQ(t)|$ by n where n is the number of collisions C in $F_j$, where $j=1, \ldots m$;

(4) If $|RQ(t)|>0$ each sending station 24 modifies $|RQ(t)|$ by (n−1) where n is the number of collisions, C, in $F_j, j=1, \ldots m$; and (5) Sending stations 24 which transmit successful requests or collided requests know their position in the TQ or the RQ and adjust their pointers or counters to the TQ or the RQ accordingly.

Using the rules presented above, the DQRAP according to this invention can be described by the following algorithm:

Set (t)=0, $|TQ(t)|=0$, and $|RQ(t)|=0$;
While (TRUE)
{
  1) t=t+1
  2) transmit data obeying the DTR;
  3) transmit(s) request(s) obeying the RTR;
  4) all stations modify their counters of the TQ and the RQ and their pointers to the TQ or the RQ following the QDR.
}

DTR(1) described above is important since it preserves the immediate access feature of random multiple access communications and distinguishes the DQRAP of this invention from reservation protocols. It is emphasized that DTR(1) may permit a collision to occur in the DS, but without DTR(1) the DS would otherwise be empty. DTR(1) improves the delay characteristics of the protocol according to this invention, especially when the input rate is low.

The algorithm to resolve queueing contention in the DQRAP according to one preferred embodiment of this invention uses ternary feedback and multiple minislots.

Figure 3:
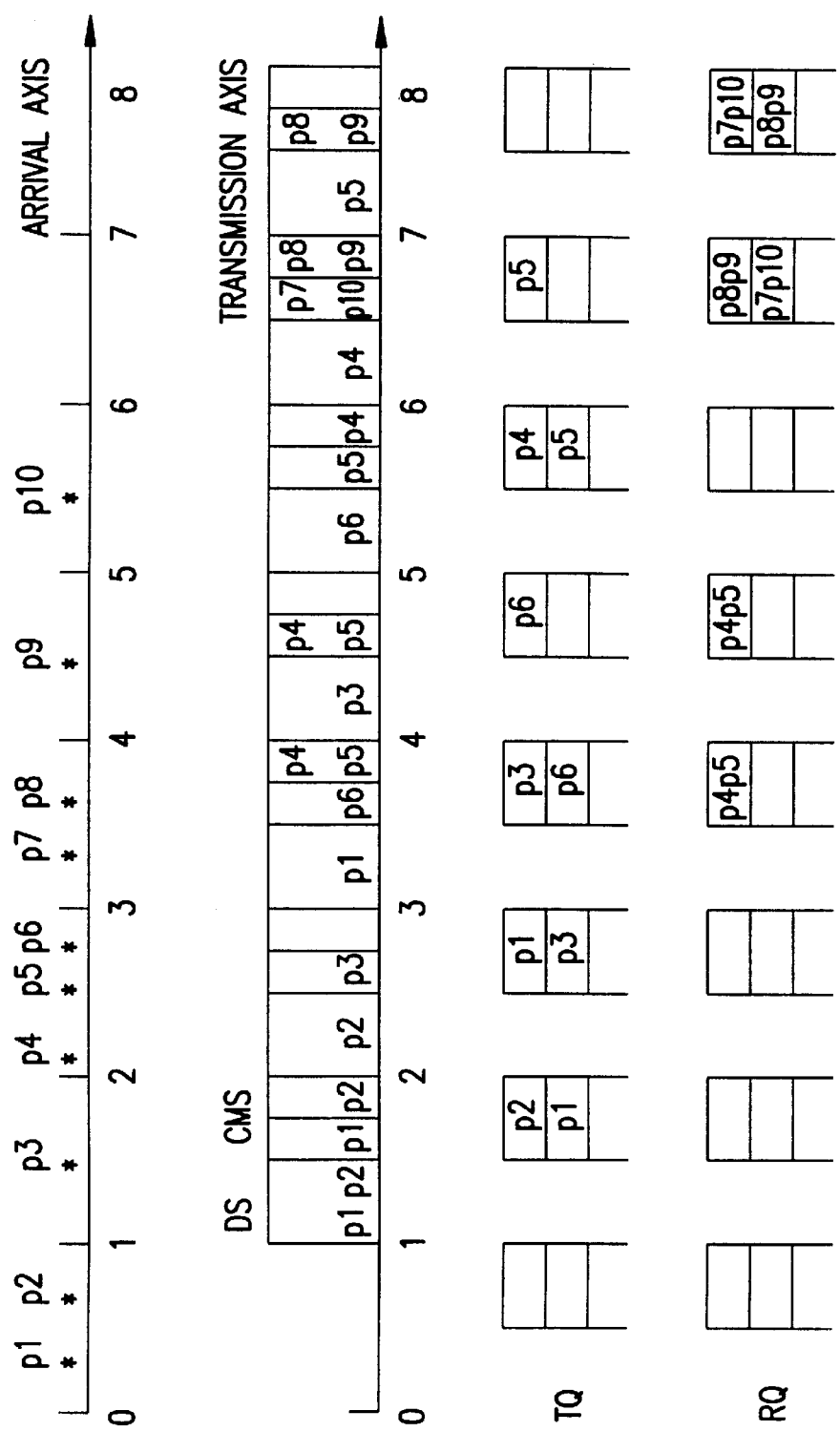
FIG. 3 is a diagrammatic view showing the operation of one preferred embodiment of a distributed queueing random access protocol (DQRAP) according to this invention.

One preferred embodiment shown in FIG. 3 describes the operation of the DQRAP of this invention. The default window size is infinite ($W_o=\infty$), for example, the ETI is equal to the waiting interval. The time axis is divided into equal slots with length of one channel unit. Above the time axis the contents of the CMS and the DS are shown in FIG. 3. Below the time axis the contents of the TQ and the RQ at each sending station 24 are shown. The asterisks denote the arrival time of messages p1, p2, ... p10. In this example two minislots are used. Assume at t=0 that both the TQ and the RQ are empty. At t=1, p1 and p2 each transmit both requests and messages. At t=2 the feedback shows that the p1 and p2 data messages have collided but their requests have not collided. p2 and p1 go into the TQ and p2 data is transmitted at t=2. Meanwhile p3, arriving in interval [1,2) transmits a request but no data since $|TQ(2)|>0$. p3 enters the TQ as p2 leaves. While p1 and p3 are waiting their turn to transmit data, p4, p5, and p6 transmit requests at t=3. p6's request is ok and p6 enters TQ but p4 and p5 collide and thus enter the RQ. p4 and p5 collide at t=4 on their first try to resolve the collision but on the next attempt at t=5 they succeed and enter the TQ, their order determined by their relative position in the minislots. p6 transmits at t=5 since the TQ operates independently of the RQ. The RQ is empty at t=6 thus p7, p8 and p9, which arrived in the interval [3,5) and could not transmit requests or data join p10 at t=6 in making their first attempt to transmit. p8 and p9 collide in the first minislot while p7 and p10 collide in the second minislot. This determines their order in the RQ. Such process then continues.

The diagrammatic view of FIG. 4a shows one slot time wherein the preceding and succeeding slot times are not shown. In such preferred embodiment according to this invention, it is assumed that TQ>0, and sending station 24(2) is at the head of the queue. Sending stations 24(1), 24(3) and 24(4) have requests to transmit so that they randomly select one CMS 34 and transmit it as a corresponding slot time. Sending station 24(3) selects the first CMS 34(1), as shown in FIG. 4a, and is successful, while sending stations 24(1) and 24(4) collide in the second CMS 34(2). As shown in FIG. 4a, there is no transmission within CMS 34(3). Following the DQRAP rules according to this invention, sending station 24(3) joins the transmission queue and awaits its turn to transmit, while sending stations 24(1) and 24(4) obtain exclusive use of the second CMS 34(2) in order to resolve their collision. The normal transmission of data in DS 32 continues. FIG. 4a shows the status of the transmission before reaching common node 20. FIG. 4b shows the status of the transmission after reaching common node 20.

As shown in FIG. 4b, DS 32 is transmitted to all sending stations 24(1)–24(4), and is also transmitted to all remaining sending stations 24(n). The single-crosshatched CMS 34 shown in FIG. 4b which is transmitted to all sending stations 24(1)–24(n) represents a successful CMS 34. The double-crosshatched CMS 34 sent to each sending station 24(1)–24(n) represents collided CMS 34, which is a result of the transmission shown within the second CMS 34(2) in FIG. 4a. As shown in FIG. 4b, the gap between DS 32 and the double-crosshatched CMS 34 being transmitted to each sending station 24 represents the fact that there was no transmission in the third CMS 24(3), as shown in FIG. 4a. Also as shown in FIG. 4a, station 24(2) is transmitting data and is at the head of the transmission queue.

FIGS. 4a and 4b represent one preferred logical organization of stations 24(1)–24(n) and the remaining network. In practical hardware applications, each CMS 34 and each DS 32 can be transmitted via transmission channel 30 which may comprise fiber, unshielded twisted pair (UTP) copper, shielded copper, coaxial cable such as that used in CATV systems, or any other suitable material. All sending stations 24 can be connected to a folded cable, which is particularly useful where a dual bus is employed. The network topology can be tree and branch, star, or any other suitable combination of other conventional topologies. It is apparent that common node 20 shown in FIGS. 4a and 4b may comprise any other suitable hardware. Furthermore, a wireless station or wireless system can be used and may comprise spread spectrum, and all of the conventional forms of signal transmission.

It is also apparent that FIGS. 4a and 4b can be put into practice with a satellite circuit wherein common node 20 is the satellite which accepts incoming signals on one frequency and maps them into another frequency for transmission to ground sending stations 24. Such ground sending stations 24 can transmit back on a third frequency to the satellite when the satellite maps the third frequency into a fourth frequency back to a main station. Depending upon the particular technology, a satellite can be equipped with means for detecting the collisions of CMS 34 and then for transmitting the feedback results to ground sending stations 24 along with DS 32. One advantage of such system is considerable reduction of a delay since sending stations 24 would receive the feedback after one round trip to a satellite in approximately 250 milliseconds, in lieu of the conventional two round trips which requires approximately 500 milliseconds. The CCTFB method according to this invention would be suitable to use in such a satellite circuit. In the instance of satellite circuits, an interleaving technique would be used to maintain the high efficiency of the DQRAP according to this invention.

Figure 4C:
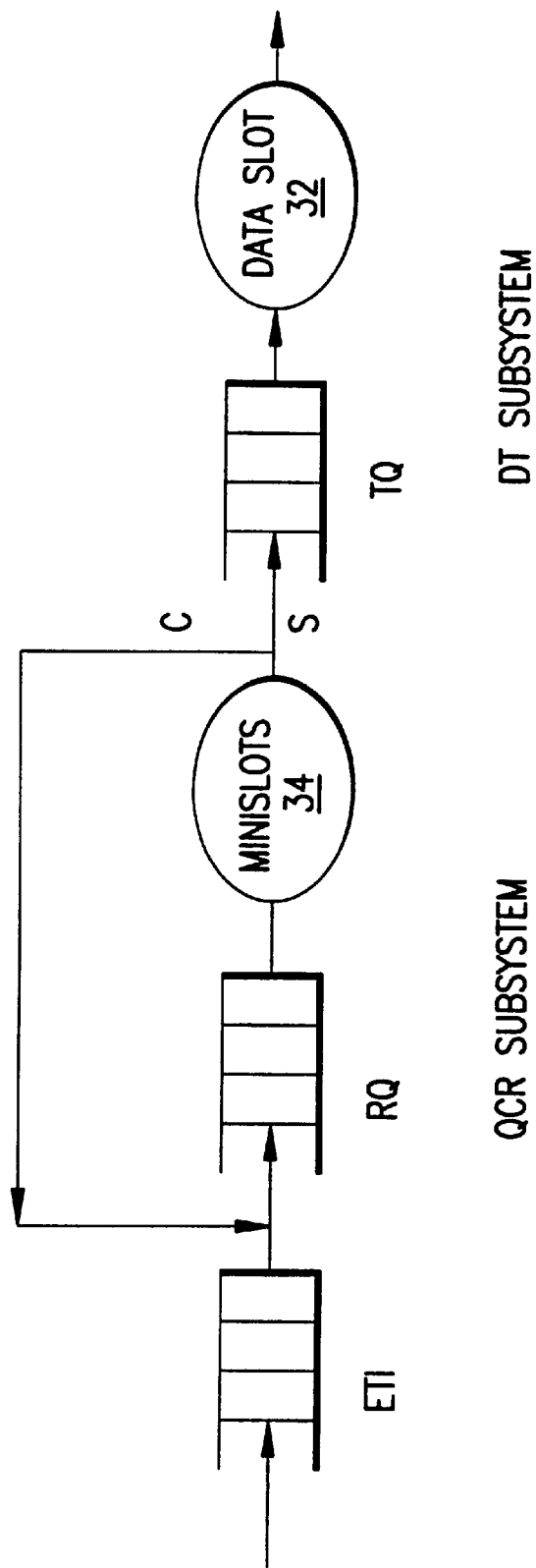
FIG. 4c is a schematic diagram showing a DQRAP according to one preferred embodiment of this invention, which is modeled as a queueing system having two subsystems, a queueing contention resolution subsystem (QCR) and a data transmission subsystem (DT)

The DQRAP of this invention can be modeled as a queueing system comprising two subsystems, as shown in FIG. 4c: (1) a queueing contention resolution subsystem (QCR); and (2) a data transmission (DT) subsystem. Such model can be used to evaluate the throughput of the DQRAP. DTR(1) is not considered, because it does not affect system throughput, as previously indicated. The servers of the QCR subsystem can be modeled as a G/D/1 queue, the server being the data slot, the service time being one slot per message.

Analysis of the subsystems first requires the calculation of the expected length $L_n$ of the CRI, defined as the period commencing with the time slot containing the initial queueing contention, if any, and ending with the slot in which the initial queueing contention is resolved. The variable n represents the number of sending stations 24 involved in the initial queueing contention and is called the multiplicity of CRI in the contention resolution algorithm literature. For consistence, a successful transmission is defined as a conflict of multiplicity 1 while an empty ETI is defined as a conflict of multiplicity 0. With $L_n$ as the expected length of CRI with multiplicity n, $L_n$ can be calculated as follows:

$$L_0 = L_1 = 1 \qquad \text{Eqn. 2}$$

$$L_2 = \frac{m}{m-1} \qquad \text{Eqn. 3}$$

$$L_n = \frac{1 + \frac{\sum_{k=2}^{n-1} \binom{n}{k}(m-1)^{n-k}L_k}{m^{n-1}}}{1 - \frac{1}{m^{n-1}}} \quad (\text{where } n > 2) \qquad \text{Eqn. 4}$$

The variable m represents the number of minislots which is chosen by performance requirements. FIG. 5 is a table containing values of $L_n$ as obtained from Eqns. 2–4 with different values of m. FIG. 5 shows that when $m \geq 3$, $L_n < n$ for n>1. This means a collision of multiplicity n can be resolved in less than n slots, which is the time to transmit n messages. Thus, the speed of contention resolution is faster than the speed of data transmission, which is a very important aspect of this invention.

The DQRAP of this invention is stable if and only if both the QCR subsystem and the DT subsystem are stable. Stability conditions of the QCR subsystem can be determined by using Markov chain theory. The maximum stable input rate, or throughput, can be determined by the following formulae:

$$C = \sup \frac{\mu}{\sum_0^\infty L_n \frac{\mu^n}{n!} e^{-\mu}} \quad (\text{where } \mu = \lambda W_0) \qquad \text{Eqn. 5}$$

FIG. 6 shows the maximum input rates and the corresponding window sizes as a function of minislot number. FIG. 6 shows that if m>2 the QCR subsystem is stable even when the input rate is greater than 1. Next consider the DT subsystem. The DT subsystem can generally be modeled as a G/D/1 queue. Though the QCR subsystem can be stable with the input rate greater than 1, G/D/1 is stable only when the input rate is less than 1. Thus the DQRAP is stable when the traffic intensity is less than 1. The QCR subsystem can resolve collisions faster than the speed of data transmission thus guaranteeing that the QCR subsystem will not block input traffic to the whole system.

The performance of the DQRAP is determined by the QCR subsystem and the DT subsystem. The QCR subsystem does not affect data transmission, and is stable even when the traffic intensity is greater than 1 if three or more minislots are utilized. Thus, since the QCR subsystem does not block traffic to the whole system, the system throughput is entirely determined by the DT subsystem, for example, the DQRAP can achieve a maximum theoretical throughput approaching one if three or more minislots are utilized. When the minislot overhead is included, the actual throughput, or utilization, that can be achieved is:

$$U = \frac{\min\{\lambda, 1\}}{1 + m\delta} \qquad \text{Eqn. 6}$$

Figure 7:
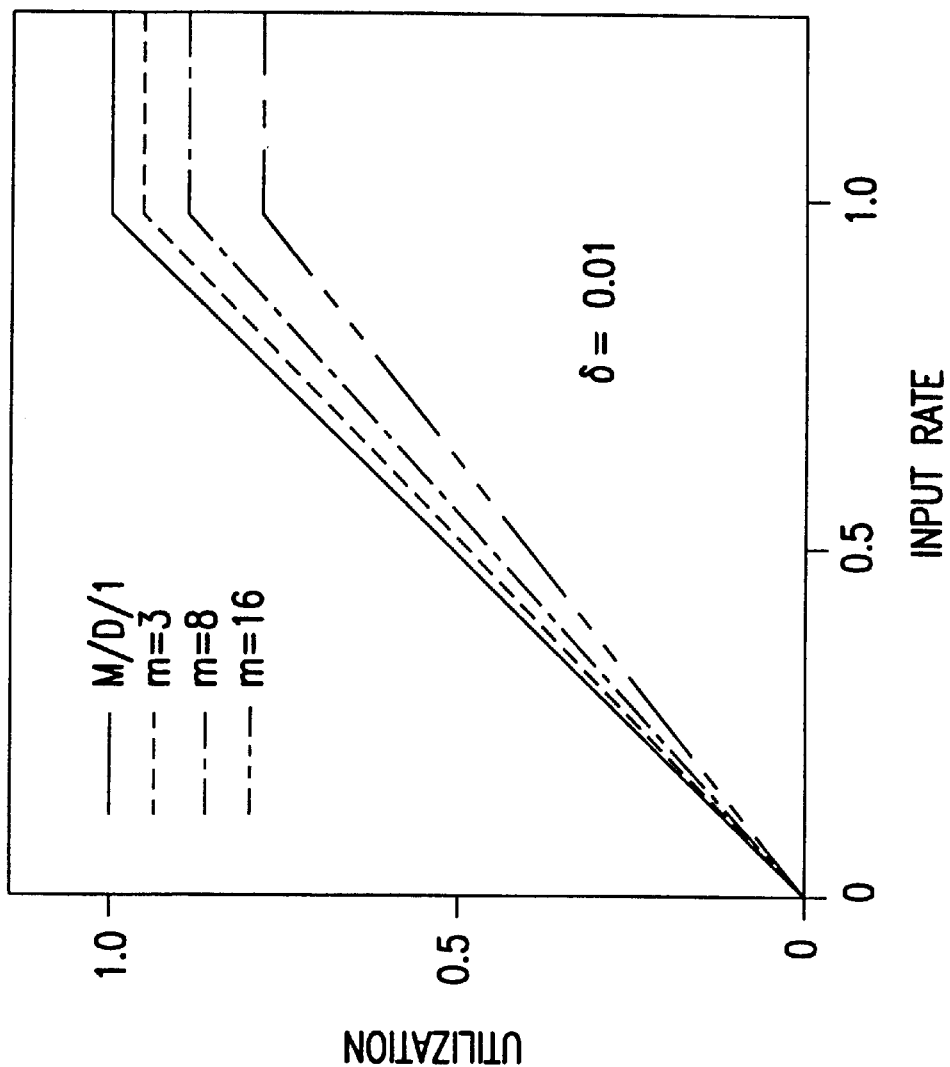
FIG. 7 is a graph showing the actual throughput of the DQRAP of this invention as a function of the input rate and the number of minislots, with the overhead equal to 0.01.
Figure 8:
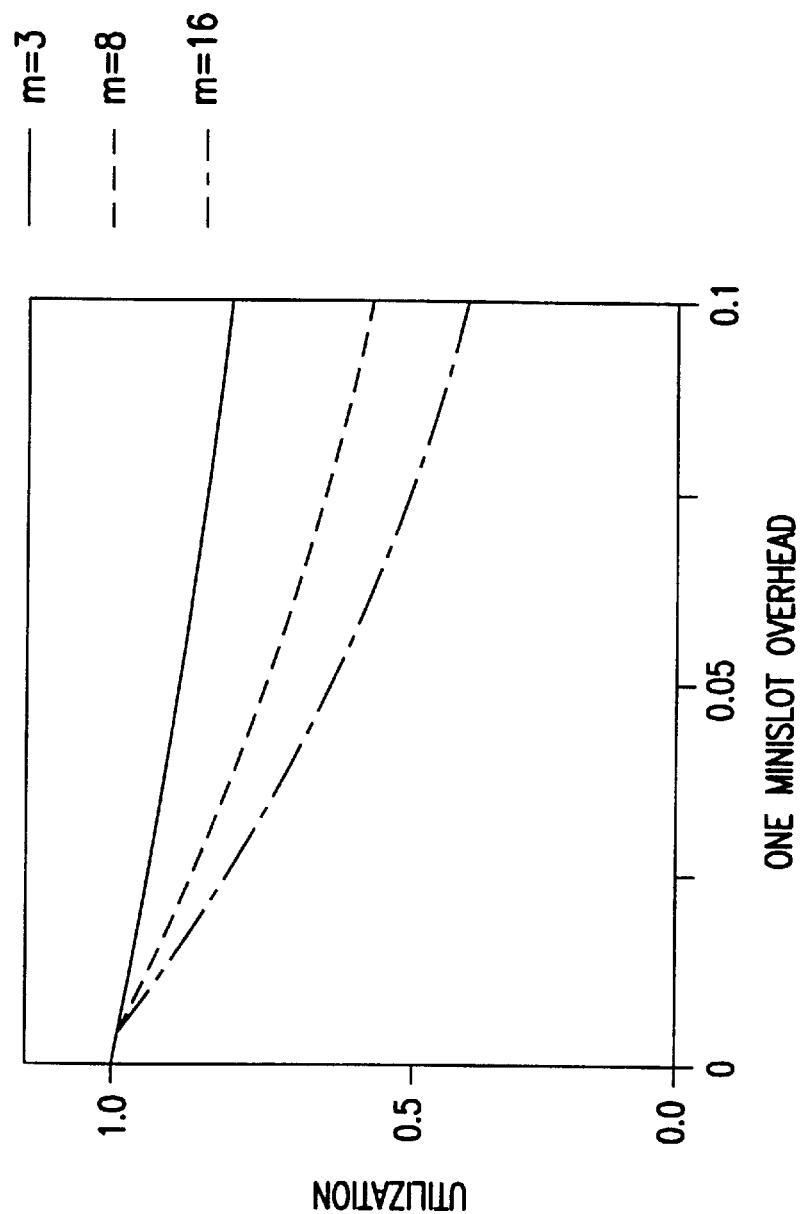
FIG. 8 is a graph showing a relationship of the maximum actual throughput as a function of one minislot overhead and the minislot number.

FIG. 7 shows the throughput of the DQRAP according to this invention as a function of the input rate and the number of minislots with the overhead equal to 0.01. FIG. 8 shows the relationship of the throughput and the number of minislots. It is apparent that high actual throughput suggests that the number of minislots selected should be as small as possible. Fortunately, evaluation shows that with as few as three minislots, the DQRAP achieves a maximum theoretical throughput of one. The analytical solution of delay characteristics for the DQRAP is known. Here an accurate simulation has been used to obtain the delay performance of the DQRAP and this performance may be evaluated by comparing it to a perfect scheduling protocol.

Figure 9:
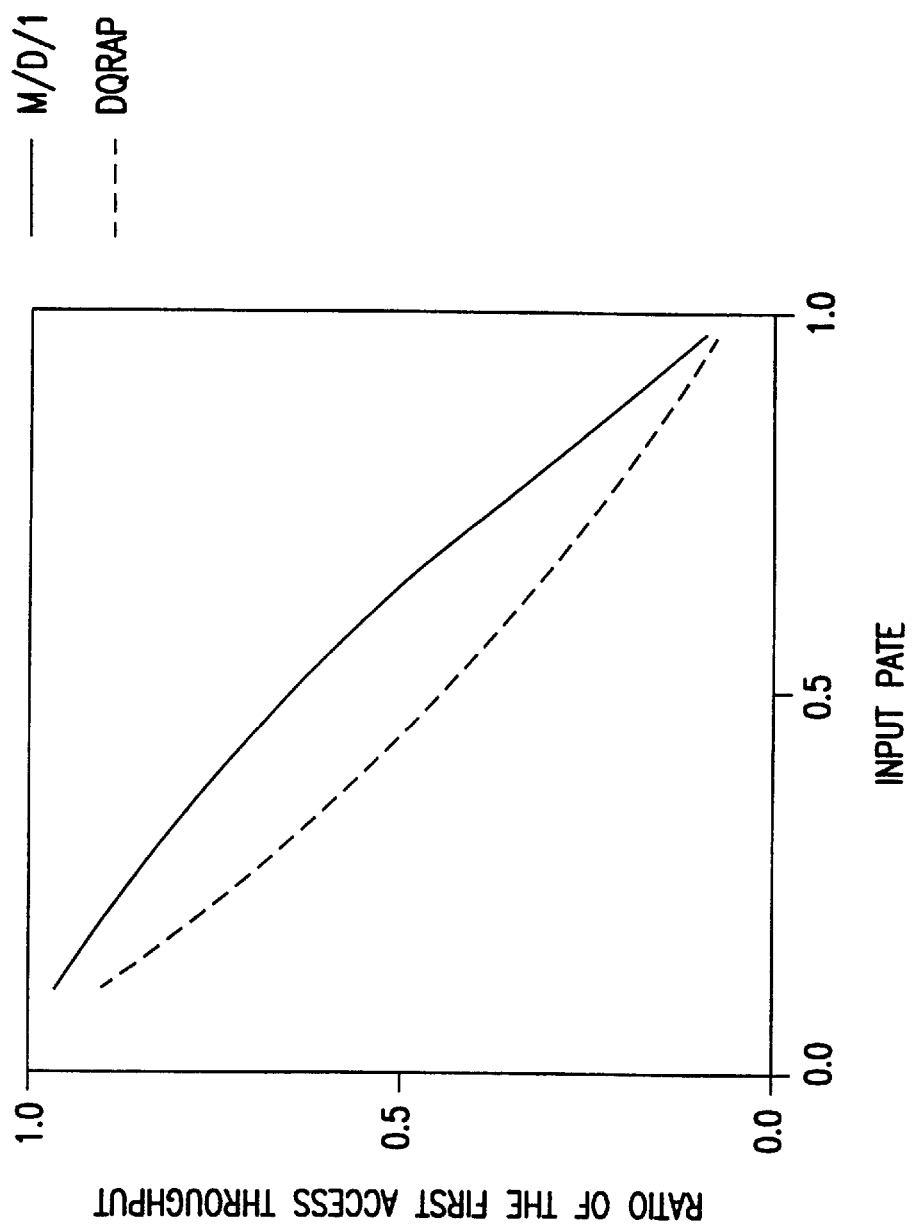
FIG. 9 is a graph showing the percentage of the first access throughput of the DQRAP of this invention, as a function of the input rate.
Figure 12:
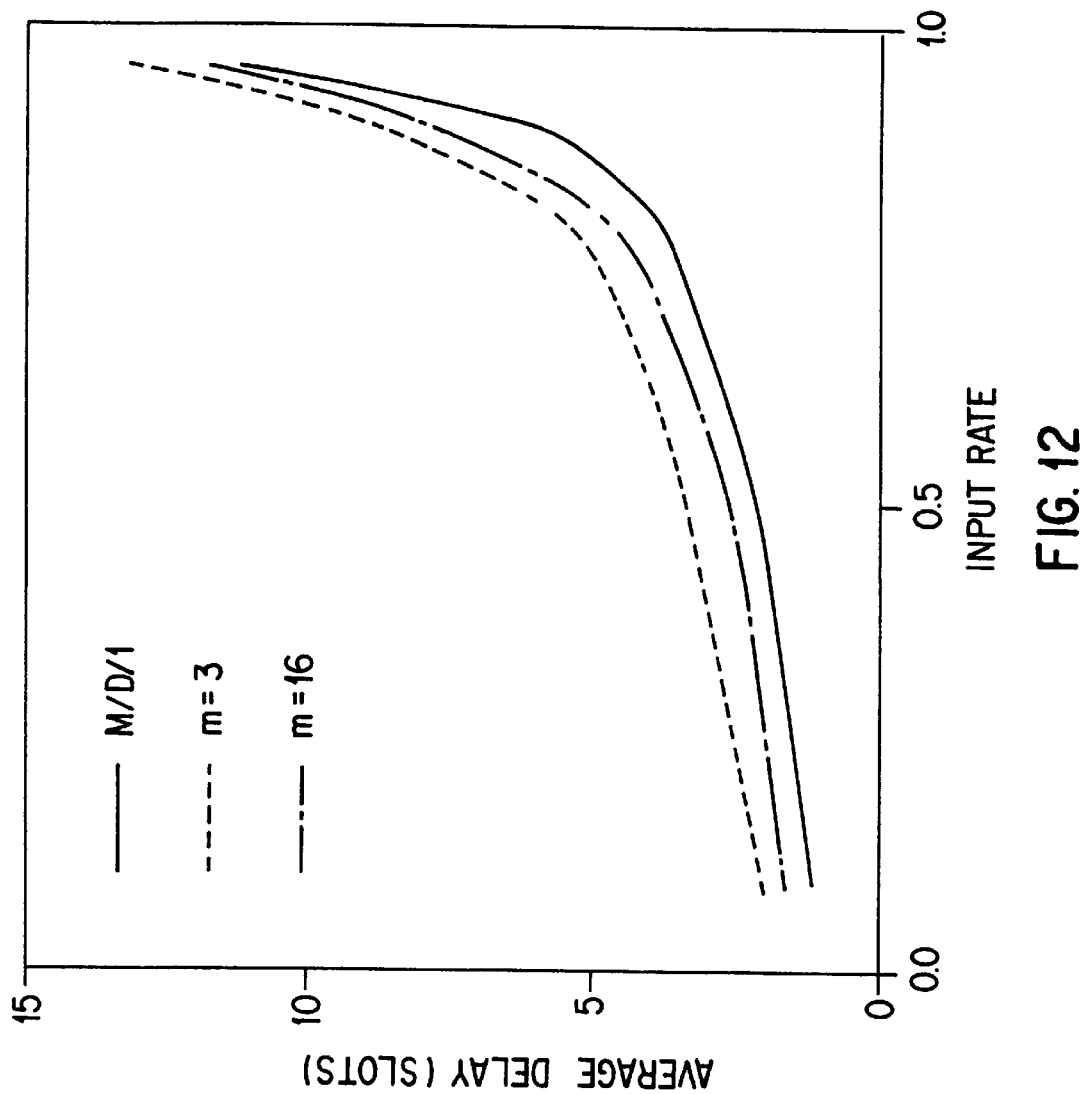
FIG. 12 is a graph showing simulated results of the average delay as a function of the input rate, for the DQRAP of this invention with three and sixteen minislots, as compared to that of an M/D/1 system.

Simulations, based upon the algorithm previously described rather than the above model, have been carried out according to this invention. The simulations show that the DQRAP according to this invention demonstrates good system stability, in particular all messages are guaranteed to be transmitted with a limited delay for all input rates less than or equal to 0.99. This is consistent with a system stability analysis. The performance bound for all random access protocols for a slotted broadcast channel shared by an infinite number of Poisson sources is that of a hypothetical perfect scheduling protocol, such as the M/D/1 system. Thus the performance of the DQRAP of this invention is best demonstrated by comparison with that of the M/D/1 system. FIG. 9 shows the ratio of the first access throughput, which is defined as the ratio of messages successfully transmitted in the first slot after their arrival to system throughput of the DQRAP, as a function of the input rate, using three minislots as compared to the M/D/1 system. FIG. 10 contains average delay and corresponding deviation of the DQRAP, three minislots being used, as compared with the M/D/1 system. FIG. 10 shows that the average delay of the DQRAP is very close to the average delay of the M/D/1 system, and the maximum difference of average delays between the M/D/1 system and the DQRAP of this invention is less than three slots when the input rate is less than 0.95. FIG. 11 shows simulated average delay and deviation of the DQRAP with a varying number of minislots. FIG. 12 plots simulation results showing the average delay of the DQRAP along with that of an M/D/1 system. FIG. 11 shows that increasing the number of minislots does not impact the maximum theoretical throughput and even though the average delay is affected by the number of minislots it appears that for most practical purposes the number of minislots need not be greater than four. Finally, the DQRAP was compared with the best known tree protocols with minislots, namely, the announced arrival random access (AARA) protocols. To achieve a theoretical throughput approaching one the announced arrival tree protocols require an infinite number of minislots, but the DQRAP of this invention requires as few as three minislots. Using three minislots the announced arrival tree protocols achieve a throughput of 0.853. The DQRAP according to this invention provides better performance than the best tree protocols known to date.

According to one preferred embodiment of this invention, a method for controlling multiple access of a transmission channel, which is preferably a duplex channel, includes assigning a plurality of different patterns to sending stations 24 so that each sending station 24 corresponds to a unique pattern. According to one preferred embodiment of this invention, each different pattern is represented by a different Binomial coefficient C(n, k). Such Binomial coefficient C(n,k) represents one of a number of ways that k distinct objects can be selected from a set of n elements. The variable n is preferably in a range from 3 to 40, and for most practical applications is in a range from 4 to 15.

The variable n is preferably approximately equal to two times the variable k, such that a maximum number of different patterns can be obtained from the Binomial coefficient C(n, k). Each Binomial coefficient can be conveniently represented by a unique binary value. It is apparent that other patterns can be used to identify each sending station 24. However, by using a Binomial coefficient C(n, k), it is apparent that each unique pattern can easily be communicated through transmission channel 30, such as a suitable wire or fiber optic line.

Each unique pattern is transmitted from a corresponding sending station 24 to transmission channel 30 by way of CMS 34. Computing means are used to receive ternary feedback from CMS 34 and to then analyze the summation of the different patterns within each CMS 34 to detect whether a collision exists between the different patterns within any particular CMS 34.

According to one preferred embodiment of this invention, an existing collision is detected by using the ternary feedback to differentiate between an absence of the pattern or no pattern present, a presence of only a single pattern, or a presence of a plurality of the patterns within any one particular CMS 34. If a collision is detected, then data to be transmitted over transmission channel 30, from each sending station 24, is prioritized according to the DQRAP of this invention.

In one preferred embodiment of this invention, the DQRAP functions according to the DTR, RTR and QDR, as discussed above.

The DQRAP according to this invention is a medium access control method which can provide performance with respect to throughput and delay approaching that of a perfect scheduling protocol. The DQRAP is stable at all input rates of less than 1 when three or more CMS 34 are utilized. The DQRAP can be implemented by overcoming the usual problems attendant with any conventional medium access control method. The major challenge is obtaining ternary feedback but it appears that this is feasible in broadband signalling over copper, fiber, and air and with baseband signalling on copper and fiber.

While in the foregoing specification this invention has been described in relation to certain preferred embodiments thereof, and many details have been set forth for purpose of illustration it will be apparent to those skilled in the art that the invention is susceptible to additional embodiments and that certain of the details described herein can be varied considerably without departing from the basic principles of this invention.

What is claimed is:

1. A method of operating a station for sending and receiving digital data, comprising:

maintaining a conflict resolution queue representative of stations sending substantially simultaneous requests for transmission resulting in a collision in a minislot;

maintaining a transmission queue representative of stations that have successfully transmitted in a minislot and can queued for data slot transmission;

sending a data slot signal comprising digital data in response to the transmission queue; and receiving a data slot signal comprising digital data; and determining whether a signal collision has occurred during a control minislot for controlling the state of the conflict resolution queue;

wherein each station of said stations corresponds to a unique pattern of a different binomial coefficient.

2. A method of operating a station according to claim 1, further comprising receiving a control minislot, said conflict resolution queue and said transmission queue being responsive thereto.

3. A station for sending and receiving digital data, comprising:

means for maintaining a conflict resolution queue representative of stations sending substantially simultaneous requests for transmission resulting in a collision in a minislot;

means for maintaining a transmission queue representative of stations that have successfully transmitted in a minislot and can be queued for data slot transmission;

means for sending a data slot signal comprising digital data in response to the transmission queue; and a data slot receiver for receiving a data slot signal representative of digital data, the data slot receiver having means for determining whether a signal collision has occurred during a control minislot and generating a conflict resolution queue signal in response thereto for controlling the state of the conflict resolution queue;

wherein each said station corresponds to a unique pattern of a different binomial coefficient.

4. A station according to claim 3, further comprising means for receiving a control minislot, wherein said means for receiving a control minislot produces a minislot signal to which said means for maintaining the conflict resolution queue and said means for maintaining the transmission queue are responsive.

5. A data transmission network comprising:

a plurality of stations for sending and receiving digital data in a data slot, at least one of the stations comprising:

means for maintaining a conflict resolution queue representative of stations sending substantially simultaneous requests for transmission resulting in a collision in a minislot;

means for maintaining a transmission queue representative of stations that have successfully transmitted in a minislot and can be queued for data slot transmission;

means for sending a control minislot signal;

means for sending a data slot signal comprising digital data in response to the transmission queue;

means for receiving a data slot signal comprising digital data; and a head-end apparatus for receiving control minislot signals and data slot signals from said stations, said head-end apparatus comprising means for receiving a control minislot and means for transmitting a signal to multiple stations indicative of whether two or more stations are asserting a request for access to a data slot;

wherein each said station corresponds to a unique pattern of a different binomial coefficient.

6. A data transmission network according to claim 5, wherein said head-end apparatus comprises a passive network for transmitting said control minislot signal to additional stations.

7. A system for transmitting and receiving data slot signals representative of digital data, comprising:

a memory for containing a conflict resolution queue and a transmission queue;

a data slot transmitter responsive to signals received from said memory representative of a current state of the conflict resolution queue and the transmission queue; and a data slot receiver for receiving a data slot signal representative of digital data, the data slot receiver having means for determining whether a signal collision has occurred during a control minislot and generating a conflict resolution queue signal in response thereto for controlling the state of the conflict resolution queue;

wherein said means for determining whether a signal collision has occurred comprises means for analyzing a summation of unique patterns within said control minislot, wherein said unique patterns comprise different binomial coefficients.

* * * * *